United States Patent
Asai et al.

(10) Patent No.: US 8,956,703 B2
(45) Date of Patent: Feb. 17, 2015

(54) METHOD FOR MANUFACTURING LIQUID EJECTING HEAD

(75) Inventors: Kazuhiro Asai, Kawasaki (JP); Masaki Ohsumi, Yokosuka (JP); Yoshinori Tagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 13/545,390

(22) Filed: Jul. 10, 2012

(65) Prior Publication Data

US 2013/0029056 A1    Jan. 31, 2013

(30) Foreign Application Priority Data

Jul. 26, 2011 (JP) .................................. 2011-163055

(51) Int. Cl.
| | |
|---|---|
| *B05D 3/06* | (2006.01) |
| *B05D 3/12* | (2006.01) |
| *B29C 39/12* | (2006.01) |
| *B41J 2/16* | (2006.01) |

(52) U.S. Cl.
CPC ............... *B29C 39/12* (2013.01); *B41J 2/1603* (2013.01); *B41J 2/1628* (2013.01); *B41J 2/1629* (2013.01); *B41J 2/1631* (2013.01); *B41J 2/1632* (2013.01); *B41J 2/1639* (2013.01); *B41J 2/1645* (2013.01)
USPC ............................ 427/487; 487/508; 487/510

(58) Field of Classification Search
CPC ....... B29C 39/12; B41J 2/1603; B41J 2/1606; B41J 2/162; B41J 2/1628; B41J 2/1629; B41J 2/1631; B41J 2/1639; B41J 2/1645; G03F 7/0002

USPC .......................................... 427/487, 508, 510
See application file for complete search history.

(56) References Cited

U.S. PATENT DOCUMENTS

| | | | |
|---|---|---|---|
| 5,728,508 A * | 3/1998 | Takemura et al. | 430/315 |
| 6,467,876 B1 * | 10/2002 | Karasawa et al. | 347/45 |

FOREIGN PATENT DOCUMENTS

| | | | | |
|---|---|---|---|---|
| JP | 05194298 | * | 8/1993 | |
| JP | 05194298 A | * | 8/1993 | |
| JP | 2009052066 | * | 3/2009 | |
| JP | 2009052066 A | * | 3/2009 | |
| JP | 2009-178906 A | | 8/2009 | |

* cited by examiner

*Primary Examiner* — Elena T Lightfoot
(74) *Attorney, Agent, or Firm* — Fitzpatrick, Cella, Harper & Scinto (57) ABSTRACT

A method for manufacturing a liquid ejecting head including an orifice plate having an ejecting orifice and a liquid channel, and a substrate having a liquid ejecting energy generating element and a liquid supply port, the method including: (1) forming a liquid channel mold of a soluble resin dissolved in (6) on the substrate; (2) coating the liquid channel mold with a photosensitive resin layer having a refractive index of n at an exposure wavelength used in (4); (3) forming an antireflective film having a refractive index of $\sqrt{n}-0.2$ or more to $\sqrt{n}+0.2$ or less at the exposure wavelength used in (4) on the photosensitive resin layer; (4) exposing and developing the photosensitive resin layer and antireflective film to form the ejecting orifice; (5) forming the liquid supply port on the substrate; and (6) dissolving and removing the liquid channel mold from the liquid supply port.

10 Claims, 5 Drawing Sheets

METHOD FOR MANUFACTURING LIQUID EJECTING HEAD

BACKGROUND OF THE INVENTION

1. Field of the Invention

The present invention relates to a method for manufacturing a liquid ejecting head of ejecting a liquid.

2. Description of the Related Art

Examples of a liquid ejecting head of ejecting a liquid, to be used, include an inkjet recording head of ejecting an ink on a recording medium to perform recording. As a conventional method for manufacturing an inkjet recording head, there is a method described in Japanese patent Application Laid-Open No. 2009-178906.

The method for manufacturing an inkjet recording head described in Japanese patent Application Laid-Open No. 2009-178906 will be briefly described. In the method, an antireflective film is first formed on a substrate including an electrothermal conversion element as an energy generating element that generates energy for ejecting a liquid. In this case, SiN is preferably used in the antireflective film, and a SiN film can be formed by plasma CVD, room temperature CVD, or the like. Furthermore, the refractive index n of the SiN film at a wavelength of 633 nm is preferably made within a range of 2.05<n. The SiN film in which the refractive index n at a wavelength of 633 nm is within the above range can further reduce the reflected light from an underlying layer at the time of forming an ink ejecting orifice by i-line exposure, thereby enabling the suppression of deformation of the ink ejecting orifice.

Then, a soluble resin is patterned on the antireflective film to form a liquid channel mold serving as a mold for forming a liquid channel. Then, the liquid channel mold is used as a mask to perform the dry etching of the antireflective film, to thereby leave behind the antireflective film only below the liquid channel mold.

Then, a photosensitive resin layer is formed on the liquid channel mold to thereby form the ink ejecting orifice by photolithography. In this case, reflection from the substrate, occurring upon exposure, is suppressed by the antireflective film, thereby enabling the ejecting orifice to be precisely patterned. Finally, the liquid channel mold is eluted with a solvent to manufacture an inkjet recording head.

In Japanese patent Application Laid-Open No. 2009-178906, the antireflective film is formed as a underlying layer (on the substrate) of a resist to thereby restrain influence of reflected light of exposure on a resist pattern. As the influences given on a resist pattern are known halation and notching, where diffusely reflected light on the substrate affects on the pattern, and a standing wave effect, where reflected light from the substrate interferes with irradiation light from an exposure machine.

However, as in Japanese patent Application Laid-Open No. 2009-178906, when the antireflective film is formed only below the liquid channel, reflection from the substrate may be insufficiently prevented in a recording head having a structure that the distance between the wall of bubbling chamber and the ejecting orifice is shorter, such as a high density arrangement that the width of the liquid channel is narrower. In addition, since the liquid channel mold is used as an etching mask, there may be variation in the height of the liquid channels among etchings.

SUMMARY OF THE INVENTION

Accordingly, an object of the present invention is to provide a method for manufacturing a liquid ejecting head that is excellent in print quality which method suppresses the influence of reflection from the substrate on an exposure pattern and can stably form an ejecting orifice pattern.

Namely, the present invention provides a method for manufacturing a liquid ejecting head at least including an orifice plate having an ejecting orifice for ejecting a liquid and a liquid channel communicating with the ejecting orifice, and a substrate having an energy generating element for generating energy for ejecting the liquid and a liquid supply port communicating with the liquid channel, the method including the steps of: (1) forming a liquid channel mold composed of a soluble resin dissolved in step (6) on the substrate on which the energy generating element is provided; (2) coating the liquid channel mold with a photosensitive resin layer having a refractive index of n at an exposure wavelength used in step (4); (3) forming an antireflective film having a refractive index of $\sqrt{n}-0.2$ or more to $\sqrt{n}+0.2$ or less at the exposure wavelength used in step (4) on the photosensitive resin layer; (4) exposing and developing the photosensitive resin layer and the antireflective film to form the ejecting orifice; (5) forming the liquid supply port in the substrate; and (6) dissolving the liquid channel mold and removing the mold from the liquid supply port.

The present invention also provides a method for manufacturing a liquid ejecting head at least including an orifice plate having an ejecting orifice for ejecting a liquid and a liquid channel communicating with the ejecting orifice, and a substrate having an energy generating element for generating energy for ejecting the liquid and a liquid supply port communicating with the liquid channel, the method including the steps of: (i) forming a liquid channel wall on the substrate on which the energy generating element is provided; (ii) forming a photosensitive resin layer having a refractive index of n' at an exposure wavelength used in step (iv) on the liquid channel wall, to form the liquid channel; (iii) forming an antireflective film having a refractive index of $\sqrt{n'}-0.2$ or more to $\sqrt{n'}+0.2$ or less at the exposure wavelength used in step (iv) on the photosensitive resin layer; (iv) exposing and developing the photosensitive resin layer and the antireflective film to form the ejecting orifice; and (v) forming the liquid supply port in the substrate.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present invention can solve the above problems by providing on a photosensitive resin layer an antireflective film having a specific refractive index for the photosensitive resin layer. It is to be noted that a liquid ejecting head obtained by the present invention can be used as an inkjet recording head that performs recording by ejecting an ink to a recording medium, and as a liquid ejecting head for use in biochip production and electronic circuit printing. Hereinafter, preferred embodiments of the present invention will be described with reference to the drawings.

It is to be noted that in the following description, the same reference numbers are given for configurations having the same function in the drawings, and further description therefor may be omitted.

Figure 1A:
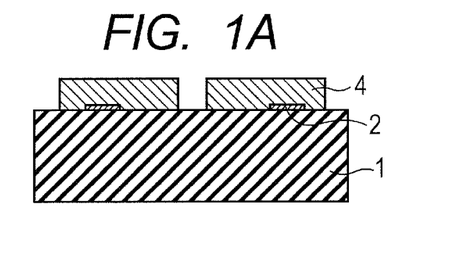
FIGS. 1A, 1B, 1C, 1D, 1E, 1F, 1G and 1H are a schematic process drawing for describing one embodiment of a method for manufacturing a liquid ejecting head of the present invention.
Figure 1H:
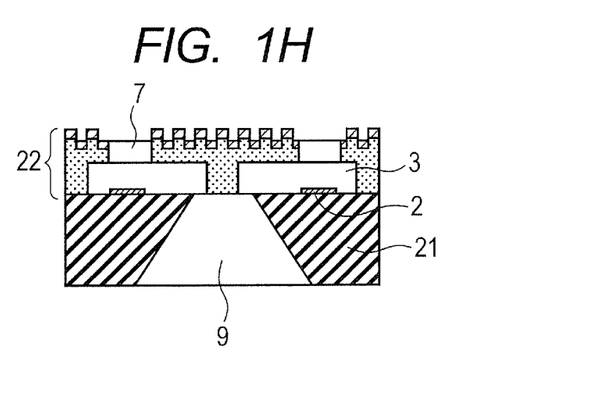
Figure 2F:
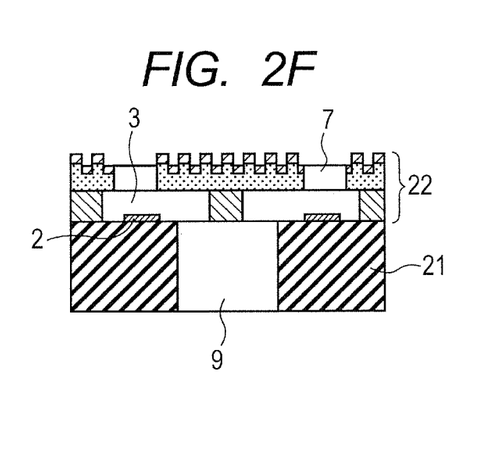
Figure 3:
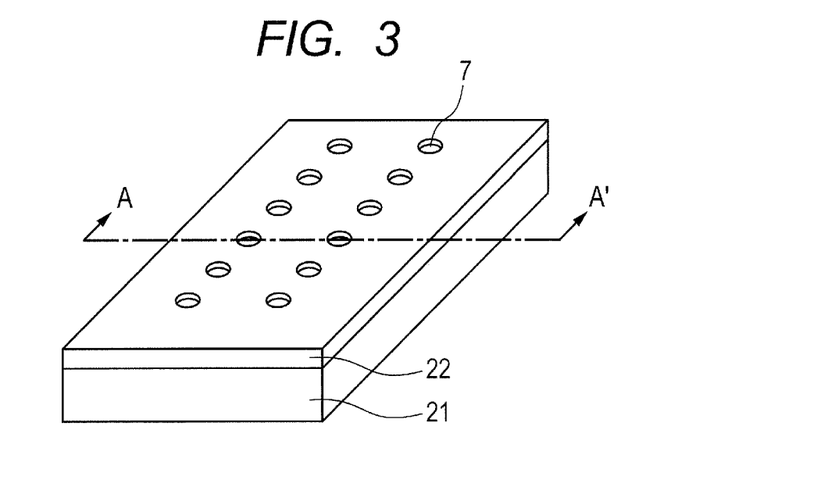
FIG. 3 is a schematic perspective view illustrating an example of a liquid ejecting head obtained by the present invention.

FIG. 3 is a schematic perspective view of one example of a liquid ejecting head obtained by the present invention. The liquid ejecting head at least includes an orifice plate 22 and a substrate 21. As illustrated in FIG. 1H and FIG. 2F, the orifice plate 22 has an ejecting orifice 7 of ejecting a liquid and a liquid channel 3 communicating with the ejecting orifice 7. The substrate 21 has an energy generating element 2 of generating energy to be utilized for ejecting a liquid, and a liquid supply port 9 communicating with the liquid channel. The liquid ejecting head further includes the ejecting orifice 7 formed above the energy generating element 2 on paper.

In FIGS. 1A to 1H, a photosensitive resin layer 5a (channel-forming member) and an antireflective film 8 are used to form the orifice plate 22, and in FIGS. 2A-2F, a liquid channel wall 13, a photosensitive resin layer 5b and the antireflective film 8 are used to form the orifice plate 22. Specifically, in FIGS. 1A to 1H, the layer 5a and the film 8 which are integrated are exposed and developed to form the ejecting orifice, and the substrate 1 and the layer 5a form the liquid channel communicating with the ejecting orifice. In FIGS. 2A to 2F, the layer 5b and the film 8 which are integrated are exposed and developed to form the ejecting orifice, and the substrate 1, the wall 13 and the layer 5b form the liquid channel.

It is to be noted that FIGS. 1A to 1H and FIGS. 2A to 2F are drawings for describing each step of the manufacturing method of the present invention with reference to the cross sections of the liquid ejecting head, taken along A-A' line of FIG. 3.

Hereinafter, each step in embodiments of the method for manufacturing a liquid ejecting head of the present invention will be described in detail with reference to FIGS. 1A to 1H and FIGS. 2A to 2F.

(Embodiment 1)
Step 1
First, as in illustrated in FIG. 1A, a liquid channel mold which serves as a mold for liquid channel and contains a soluble resin dissolved in Step 6 described later is formed on a substrate provided with an energy generating element. Specifically, for example, a soluble resin is deposited on a substrate 1 provided with an energy generating element 2 and the soluble resin is patterned, thereby enabling forming a liquid channel mold 4 serving as a mold for forming a liquid channel.

As the substrate, for example, a Si wafer having a crystal axis (100) can be used.

As the energy generating element, for example, an electrothermal conversion element or a piezoelectric element can be used. In the case that, for example, the electrothermal conversion element is used, the element heats a liquid (e.g., ink) in the vicinity of the element, thereby enabling causing the change of state in the liquid to generate ejecting energy. The soluble resin can be, if necessary, selected as long as the resin can be dissolved and removed from a liquid supply port in Step 6, and as the resin, a photosensitive resin is preferably used from the viewpoint of precisely patterning a positional relationship with the energy generating element 2. As the soluble resin, for example, poly(methyl isopropyl ketone) (PMIPK) (positive type photosensitive resin) can be used. It is to be noted that PMIPK can be dissolved using, for example, a solvent (methyl acetate) in Step 6.

As a method for depositing the soluble resin on the substrate, for example, there is a method in which the resin is dissolved in a solvent appropriately selected, and formed into a coating film by a spin coating method or the like. In the case that, for example, PMIPK is used as the resin, cyclohexanone can be used as the solvent.

It is to be noted that the liquid channel mold may be directly formed on the surface of the substrate, or other layers (e.g., adhesion layer and planarizing layer) may be provided between the substrate and the liquid channel mold.

Step 2

Figure 1B:
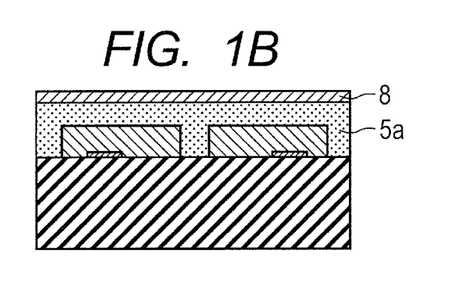
Figure 1C:
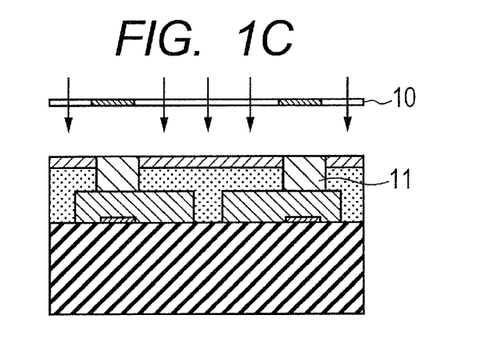
Figure 1D:
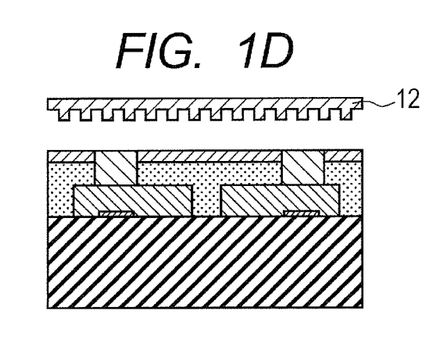

Then, as illustrated in FIG. 1B, the liquid channel mold 4 is coated with a photosensitive resin layer 5a having a refractive index of n at an exposure wavelength used in Step 4. It is to be noted that the refractive index n is the refractive index of the photosensitive resin layer 5a before exposure, obtained in Step 2. The refractive index n of a photosensitive resin to be commonly used is 1.5 or more and 1.7 or less at the exposure wavelength in Step 4.

The photosensitive resin layer 5a can be formed by applying a solution containing a photosensitive resin material on the liquid channel mold 4 by, for example, a spin coating method. It is to be noted that the photosensitive resin layer 5a may be directly formed on the liquid channel mold 4, or other layers (e.g., anti-compatibilization layer and anti-scum layer) may be provided between the layer 5a and the mold 4.

For the photosensitive resin layer 5a, a high mechanical strength as a material configuring a liquid channel wall, adhesion properties to the substrate, and solvent resistance are desired. It is desirable to use a photosensitive resin that can be formed by photolithography in order to precisely pattern a positional relationship between an ejecting orifice 7 and the energy generating element 2. Furthermore, it is desirable that the liquid channel mold 4 be coated with the photosensitive resin layer 5a having a proper thickness. Specifically, the thickness of the layer 5a from the surface of the substrate (in FIG. 1B, corresponding to a distance between the substrate 1 and an antireflective film 8) is preferably 20 μm or more and 100 μm or less from the viewpoint of ejection. It is to be noted that both the thickness of the liquid channel mold 4 and the thickness of the liquid channel wall 13 described later are preferably 5 μm or more from the viewpoint of refill and 20 μm or less from the viewpoint of ejection efficiency.

Since the thickness of the photosensitive resin layer 5a is an important factor for determining the distance between the ejecting orifice 7 and the energy generating element 2, it is desirable to use a material that can be precisely formed, to form the layer 5a. From these viewpoints, in the photosensitive resin layer 5a, an epoxy resin is preferably used as a material for forming a photosensitive resin layer. Examples of the epoxy resin include a bisphenol A-type epoxy resin.

A material obtained by adding a cationic photopolymerization initiator to the epoxy resin is preferably used as the material for forming a photosensitive resin layer. A cured article formed by cationic polymerization of the epoxy resin, that is obtained by forming the photosensitive resin layer 5a by using the material, and exposing the layer 5a in Step 4, has excellent strength, adhesion properties and solvent resistance, and has excellent patterning properties.

A solvent for dissolving a resin material of the photosensitive resin layer 5a is desired to have properties such as undeformation of the liquid channel mold 4 containing the soluble resin. Namely, in the case that the resin material of the photosensitive resin layer 5a is dissolved in the solvent and the resultant is applied on the liquid channel mold 4 by spin coating or the like to form the layer 5a, the solvent for dissolving the photosensitive resin material is desirably selected from solvents not dissolving the liquid channel mold 4. In the case that, for example, the epoxy resin is used as the photosensitive resin material of the layer 5a, a mixed liquid of xylene and methyl isobutyl ketone can be used as the solvent for dissolving the resin material.

Step 3

An antireflective film 8 having a refractive index of $\sqrt{n}-0.2$ or more and $\sqrt{n}+0.2$ or less at the exposure wavelength used in Step 4 is further formed on the photosensitive resin layer 5a by, for example, a curtain coating method. It is to be noted that the refractive index is the refractive index of the antireflective film 8 before exposure, obtained in Step 3. The refractive index of the antireflective film 8 is within a range of $\sqrt{n}\pm0.2$ relative to the refractive index n of the photosensitive resin layer 5a, thereby enabling making the reflectance factor in the antireflective film smaller and attenuating the multiple interference. Herein, in the case that the exposure wavelength in Step 4 is, for example, 365 nm, the refractive indexes of the layer 5a and the film 8 mean the refractive index at a wavelength of 365 nm. The refractive indexes of the layer 5a and the film 8 can be specified by spectroscopic ellipsometry.

As described above, since the refractive index of the photosensitive resin layer 5a is usually 1.5 or more and 1.7 or less at the exposure wavelength in Step 4, use of an antireflective film having a refractive index of 1.1 or more and 1.4 or less at the exposure wavelength in Step 4 can achieve the effect of the present invention. It is to be noted that the refractive index of the antireflective film in this case can be 1.2 or more and 1.4 or less in light of practicality.

The antireflective film can be formed on the surface of the photosensitive resin layer 5a, more specifically, can be formed so as to coat the whole surface of the photosensitive resin layer 5a, to be exposed in Step 4.

When the film 8 is formed by using a curtain coating method, the solvent for dissolving the film 8 is desirably selected from solvents with no influence on the material of the film 8 and the layer 5a. Herein, as the material of the film 8, a perfluoroalkyl compound such as perfluoroalkyl acrylate can be used. In addition, as the solvent, for example, xylene can be used.

Step 4 and Mold Template Pressing Step

Then, the photosensitive resin layer 5a and the antireflective film 8 are exposed and developed to form the ejecting orifice (Step 4). Specifically, as in FIG. 1C, pattern exposure is performed via a mask 10 to thereby form a latent image 11 to be formed into the ejecting orifice 7, on the photosensitive resin layer 5a and the antireflective film 8. It is to be noted that the mask 10 when using negative type resist (e.g., SU-8 (trade name, Kayaku MicroChem) and TMMR (trade name, Tokyo Ohka Kogyo Co., Ltd.)) for the layer 5a and the film 8 is illustrated in FIG. 1, and the latent image 11 is formed on an unexposed portion.

Hereinafter, influence of reflected light of exposure on a resist pattern will be described.

Figure 4A:
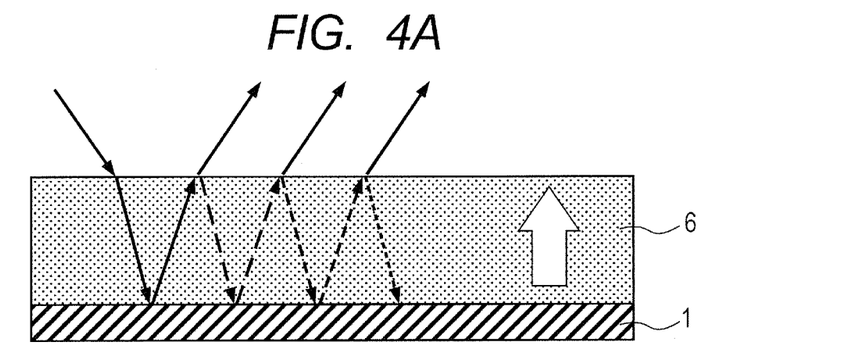
FIGS. 4A and 4B are a schematic cross-sectional view for describing multiple interference phenomena in a resist by reflected light.

As illustrated in FIG. 4A, conventionally, a multiple interference effect has occurred in which reflected light from the substrate 1 is reflected again at an interface between resist 6 and air, travels into the resist, and interferes with light newly radiated from an exposure machine, thereby not forming the resist pattern stably, in some cases.

Figure 4B:
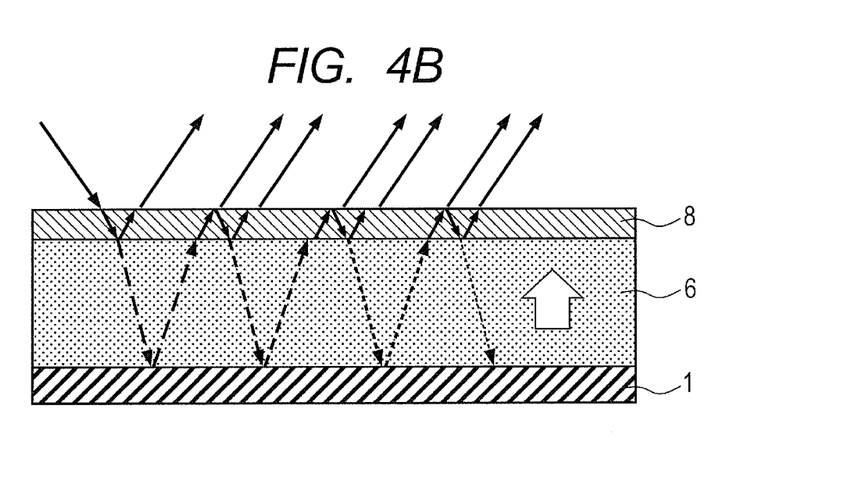

On the other hand, in the present invention, as illustrated in FIG. 4B, the antireflective film 8 having the specific refractive index for the surface of the resist (corresponding to the photosensitive resin layer) is formed, thereby enabling reducing reflected light traveling into the resist, and attenuating the multiple interference.

Figure 6:
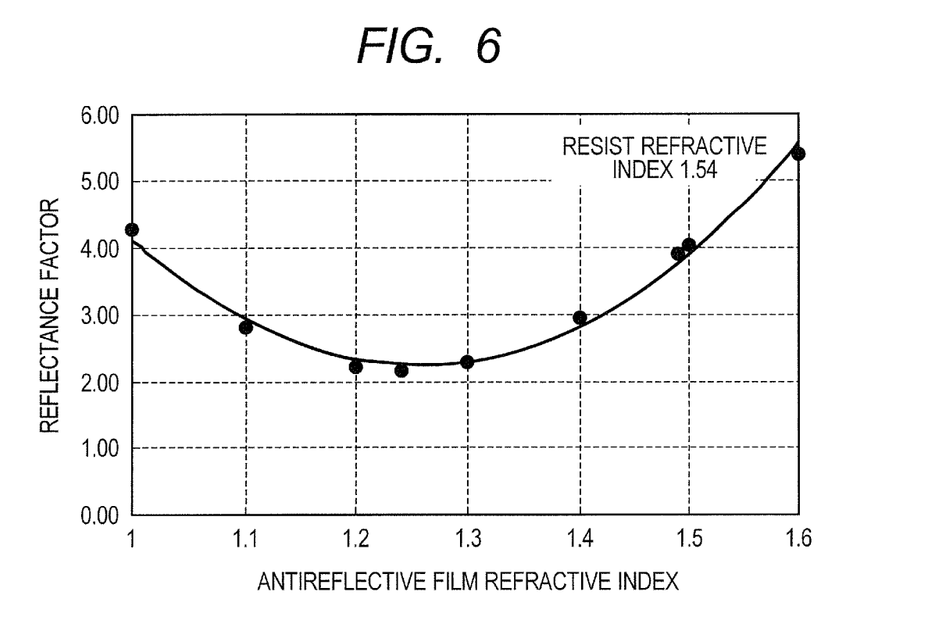
FIG. 6 is a graph illustrating a relationship between a refractive index and a reflectance factor of an antireflective film.

Specifically, as an example, the case that the refractive index n of the photosensitive resin layer at an exposure wavelength of 365 nm is 1.54 will be described. FIG. 6 is a graph illustrating a relationship between the refractive index and the reflectance factor of the antireflective film at an exposure wavelength of 365 nm on the substrate 1 having the resist 6 (refractive index n: 1.54) and the antireflective film 8 illustrated in FIG. 4B. Herein, the reflectance factor is a factor proportional to reflectance. As illustrated in FIG. 6, in the case that the refractive index n of the resist 6, namely, the photosensitive resin layer is 1.54, the refractive index of the antireflective film is set within a range from 1.04 (corresponding to $\sqrt{n}-0.2$) to 1.44 (corresponding to $\sqrt{n}+0.2$), thereby enabling making the reflectance factor in the antireflective film smaller and attenuating the multiple interference.

It is to be noted that in the present invention, a step of pressing the photosensitive resin layer 5a and the antireflective film 8 that are in the state of a latent image after exposure in Step 4 with a mold template having an asperity structure can be included from the viewpoint of water repellency. Specifically, as in FIG. 1D, a mold template (mold) having an asperity structure 12 is pressed on the antireflective film 8 and the photosensitive resin layer. The asperity structure is preferably made with fine irregularities to achieve water repellency. Specifically, the mold 12 is preferably a mold template wherein columnar projections having a width of 50 nm or more and 500 nm or less are arranged at a density of at least 5 projections/$\mu m^2$ or more. It is to be noted that as the columnar projections, for example, projections having a columnar or quadrangular prism shape can be used. In order to make a part of the latent image of the photosensitive resin layer bare on the surface and to easily perform development, the height of the columnar projection (the thickness of the columnar projection in the direction perpendicular to the substrate 1) is preferably greater than the thickness of the antireflective film.

Figure 1E:
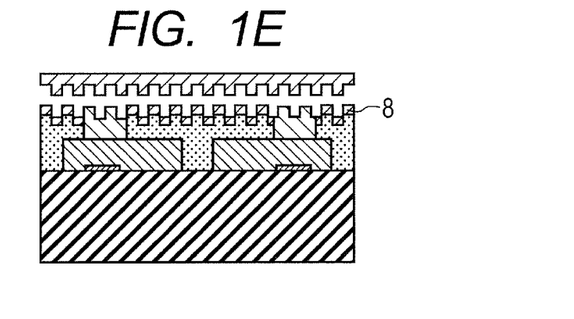

Then, as in FIG. 1E, the mold is released from the photosensitive resin layer and the antireflective film 8. In this case, the asperity surface of the mold may be treated with fluorine in advance so that the mold is easily released.

Figure 1F:
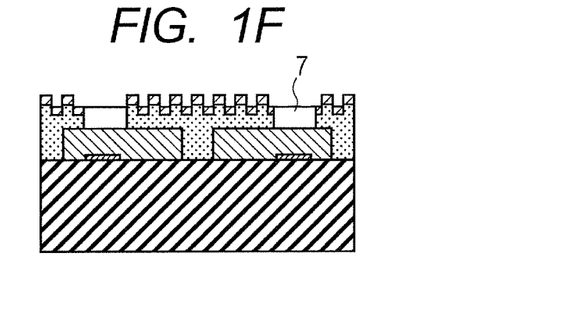

Then, as in FIG. 1F, an unexposed portion (latent image 11) of the photosensitive resin layer 5a and the antireflective film 8 is immersed in, for example, a developer and thus developed, thereby enabling forming the ejecting orifice 7. As the developer, for example, xylene can be used.

Step 5

Figure 1G:
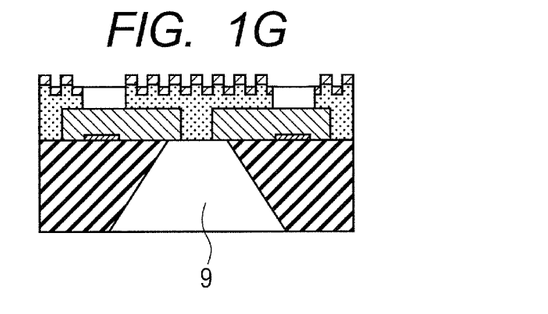

Then, as illustrated in FIG. 1G, a liquid supply port 9 which is an opening for liquid supply is formed on the substrate 1 by, for example, anisotropic etching such as dry etching or wet etching. As an etching liquid for a silicon substrate, for example, tetramethylammonium hydroxide (TMAH) can be used.

Step 6

Finally, as illustrated in FIG. 1H, the liquid channel mold 4 soluble in the solvent is dissolved and removed, namely eluted from the liquid supply port 9. Such elution can easily be performed by immersion in a solvent, spraying with a solvent, or the like. Combination use with ultrasonic or the like can further shorten an eluting time. The mold 4 is more easily dissolved depending on the types of the soluble resin, if being irradiated with light. After the liquid channel mold 4 is eluted, the photosensitive resin layer 5a can be further cured with light or heat in order to easily withstand usage environment of a printer as a structural material for the liquid channel wall.

From the foregoing, an inkjet recording head including an orifice plate 22 having a liquid channel 3 and an ejecting orifice 7 as well as a substrate 21 having an ink supply port 9 and an element 2 can be obtained. To the thus formed inkjet recording head, mounting of an ink supply member for supplying an ink and electrical jointing of an electric wiring member for driving the electrothermal conversion element 2 (not illustrated) can further be performed.

(Embodiment 2)

In Embodiment 2 of the present invention, unlike Embodiment 1, a liquid channel 3 is produced by a substrate 1, a liquid channel wall 13 and a photosensitive resin layer 5b without a liquid channel mold 4. Hereinafter, Embodiment 2 will be described in detail.

Step i

Figure 2A:
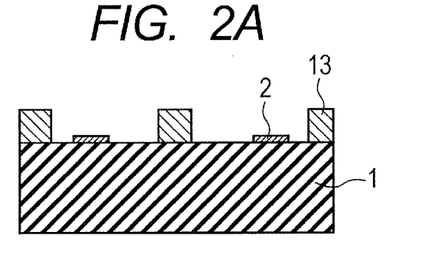
FIGS. 2A, 2B, 2C, 2D, 2E and 2F are a schematic process drawing for describing another embodiment of the method for manufacturing a liquid ejecting head of the present invention.

First, as illustrated in FIG. 2A, a liquid channel wall 13 is formed on a substrate provided with an energy generating element 2. Specifically, for example, a resin to be formed into a liquid channel wall is deposited on a substrate made of silicon 1 including the energy generating element 2, and patterned, thereby enabling forming the liquid channel wall 13. Examples of a resin to be used for the liquid channel wall can include an epoxy resin. It is to be noted that the material of the photosensitive resin layer 5b and the material of the liquid channel wall 13 to be used may be different or may be the same.

Step ii

Figure 2B:
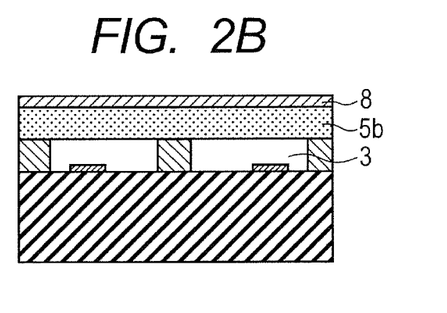

Then, as illustrated in FIG. 2B, a photosensitive resin layer 5b having a refractive index of n' at an exposure wavelength in Step iv is formed on the liquid channel wall by, for example, a lamination method, thereby forming the liquid channel 3. The refractive index of a common photosensitive resin 5 is often within a range of 1.5 or more and 1.7 or less. Examples of a material of the photosensitive resin layer 5b can include a dry film (TMMF (trade name) produced by Tokyo Ohka Kogyo Co., Ltd.).

It is to be noted that the photosensitive resin layer 5b may be directly formed on the liquid channel wall 13, or other layers (e.g., adhesion layer and planarizing layer) may be provided between the layer 5b and the wall 13. When the photosensitive resin layer 5b is laminated, the soluble resin to be used in Embodiment 1 may be embedded on the portion of the liquid channel 3 from the viewpoint of making tent property favorable. As an embedding method, for example, there is a method in which the soluble resin is formed by a spin coating method or the like so as to coat the liquid channel wall 13, before Step ii, and then polished until the surface of the liquid channel wall 13 in contact with the photosensitive resin layer 5b appears in FIG. 2B.

The total thickness of the liquid channel wall 13 and the photosensitive resin layer 5b is preferably 20 μm or more and 100 μm or less from the viewpoint of ejection.

Thereafter, Steps iii to v can be performed in the same manner as in Steps 3 to 5 described above. In this case, it is assumed that the refractive index of the antireflective film is $\sqrt{n'}-0.2$ or more and $\sqrt{n'}+0.2$ or less at the exposure wavelength in Step iv. Thus, the reflectance factor of the antireflective film can be made smaller, and the multiple interference can be attenuated. Step iv may preferably include the mold template pressing step described above, as in Step 4, in the state of being a latent image after exposure from the viewpoint of water repellency.

It is to be noted that from the viewpoint of suppressing the influence of the substrate on the exposure pattern due to reflection in the two Embodiments described above, the refractive index of the photosensitive resin layer and the refractive index of the antireflective film are assumed to the refractive indexes before exposure at an exposure wavelength in forming the ejecting orifice.

It is to be noted that the antireflective film may preferably contain a perfluoroalkyl compound from the viewpoint of the refractive index, and also an adjuster containing other fluorine compound may be added to the antireflective film 8 in order to easily achieve the desired refractive index. In this case, the content of the perfluoroalkyl compound in the antireflective film can be adjusted depending on the desired refractive index, and the antireflective film can also be formed from the perfluoroalkyl compound. Examples of the perfluoroalkyl compound can include perfluoroalkyl acrylate and perfluoroalkyl methacrylate, and examples of the fluorine compound as the adjuster can include perfluoropolyether.

According to the method for manufacturing a liquid ejecting head of the present invention, reflection from the substrate is suppressed on the upper portion (antireflective film) to thereby enable stably producing a liquid ejecting head in the ejecting orifice forming step. In addition, the fine asperity structure is provided on the surface of the orifice plate to thereby easily enable obtaining the desired water repellency.

EXAMPLES

Example 1

An inkjet recording head was produced according to FIG. 1.

First, a solution obtained by dissolving PMIPK as a soluble resin in a solvent (cyclohexanone) was applied on a substrate made of silicon 1 provided with a heat resistor as an energy generating element 2 by a spin coating method to form a resin film. Then, the resin film was patterned to form a liquid channel mold 4 as illustrated in FIG. 1A (step 1).

Then, a solution obtained by dissolving in a solvent (xylene) an epoxy resin having a refractive index of 1.54 at an exposure wavelength of 365 nm in forming an ejecting orifice in Step 4 was applied on the liquid channel mold 4 by a spin coating method to form a photosensitive resin layer 5a (step 2). Herein, the thickness of the photosensitive resin layer 5a (corresponding to a distance between the substrate 1 and a layer 8) was made 25 μm.

Furthermore, as illustrated in FIG. 1B, a solution obtained by dissolving in a solvent (xylene) perfluoroalkyl acrylate having a refractive index of 1.34 at a wavelength of 365 nm was applied on the photosensitive resin layer 5a by a curtain coating method to form an antireflective film 8 (step 3). Herein, the thickness of the antireflective film was made 0.83 μm.

Then, as in FIG. 1C, pattern exposure (exposure wavelength: 365 nm) was performed via a mask 10, thereby forming a latent image 11, where an unexposed portion was to be formed into an ejecting orifice 7, on the photosensitive resin layer 5a and the antireflective film 8.

Then, as in FIG. 1D, as a mold having an asperity structure 12, a mold for nanoimprint, where dot patterns having a height of 1 μm and a square of 200 nm×200 nm were arranged in a matrix at a pitch of 200 nm, was pressed on the antireflective film 8 and the photosensitive resin layer 5a (mold template pressing step). Herein, the asperity surface of the mold was treated with fluorine in advance so that the mold was easily released. Then, as in FIG. 1E, the mold was released from the layer 5a and the film 8, and a substrate where the asperity surface of the mold 12 was transferred on the surface of the film 8 was obtained.

Then, as in FIG. 1F, the unexposed portion of the photosensitive resin layer 5a and the antireflective film 8 was immersed in a mixed liquid of xylene and methyl isobutyl ketone, as a developer, thereby forming an ejecting orifice 7 (step 4).

Furthermore, as illustrated in FIG. 1G, an ink supply port 9 was formed on the substrate 1 by anisotropic etching using TMAH as an etching liquid (step 5).

Finally, as illustrated in FIG. 1H, the liquid channel mold 4 soluble in a solvent (methyl acetate) is eluted from the ink supply port 9 to form a liquid channel (step 6). From the foregoing, an inkjet recording head including an orifice plate 22 having the liquid channel 3 and the ejecting orifice 7 as well as a substrate 21 having the ink supply port 9 and the element 2 was obtained.

Example 2

An inkjet recording head was produced according to FIG. 2.

First, as illustrated in FIG. 2A, PMIPK as a resin to be formed into a liquid channel wall was deposited and patterned on a substrate made of silicon 1 provided with a heat resistor as an energy generating element 2 to thereby form a liquid channel wall 13 (step i). Herein, the thickness of the liquid channel wall 13 was 14 μm.

Then, as illustrated in FIG. 2B, a photosensitive resin layer 5b containing an epoxy resin was formed by a lamination method (step ii), and further an antireflective film 8 containing a perfluoroalkyl compound was formed by a curtain coating method (step iii). Herein, the refractive index of the photosensitive resin layer 5b was 1.54 and the refractive index of the antireflective film 8 was 1.34 at an exposure wavelength of 365 nm in forming an ejecting orifice in Step iv. In addition, the thickness of the photosensitive resin layer 5b was 25 μm and the thickness of the antireflective film was 0.83 μm.

Figure 2C:
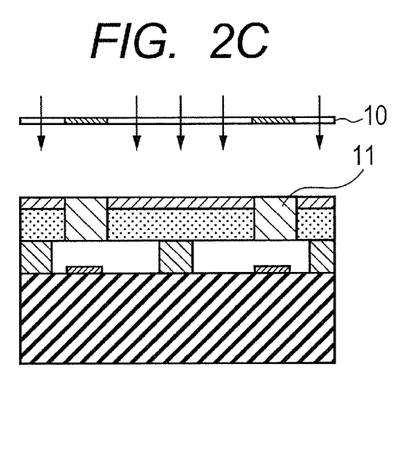
Figure 2D:
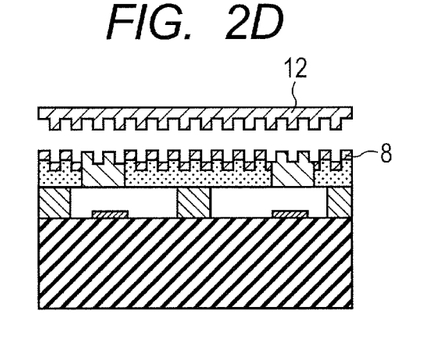
Figure 2E:
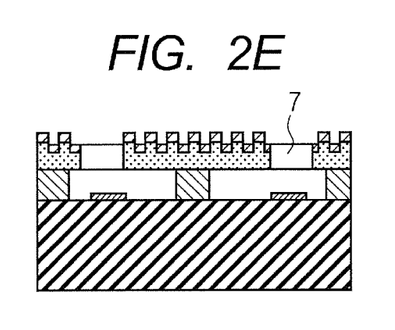

Then, as in FIG. 2C, pattern exposure (exposure wavelength: 365 nm) was performed via a mask 10, thereby forming a latent image 11, where an unexposed portion was to be formed into an ejecting orifice 7, on the photosensitive resin layer 5b and the antireflective film 8. Then, as in FIG. 2D, the same mold 12 as the mold used in Example 1 was pressed on the antireflective film 8 and the photosensitive resin layer 5b (mold template pressing step). Then, as in FIG. 2E, the unexposed portion of the photosensitive resin layer 5b and the antireflective film 8 was immersed in a mixed liquid of xylene and methyl isobutyl ketone, as a developer, thereby forming the ejecting orifice 7 (step iv).

Finally, as illustrated in FIG. 2F, an ink supply port 9 as an opening for liquid supply was formed on the substrate 1 by anisotropic etching using TMAH as an etching liquid (step v).

From the foregoing, an inkjet recording head including an orifice plate 22 and a substrate 21 was obtained.

Examples 3 and 4

Each inkjet recording head was produced in the same manner as in each of Examples 1 and 2 except that the refractive index of the antireflective film at a wavelength of 365 nm was changed to 1.40.

Figure 5A:
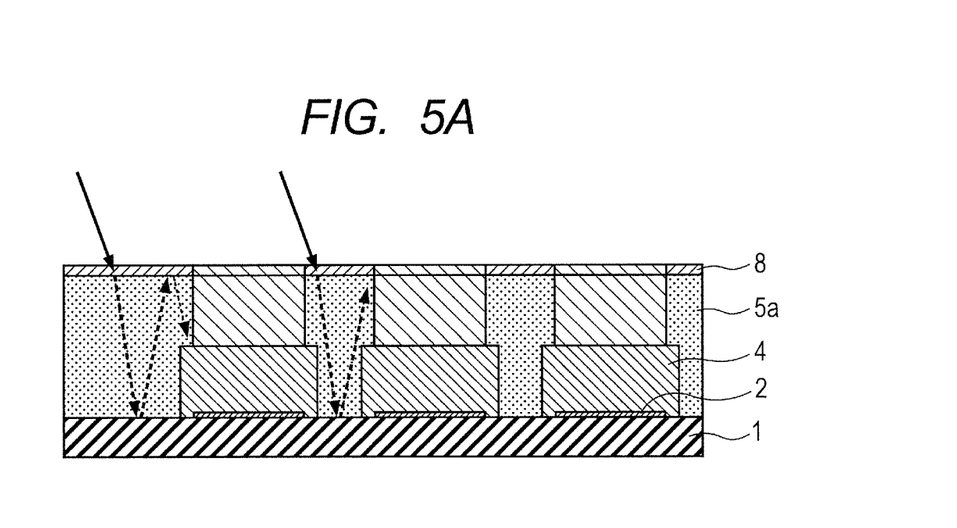
FIGS. 5A and 5B are a schematic cross-sectional view for states of reflected light in the present invention and a conventional method.

In Examples 1 to 4, as illustrated in FIG. 5A, the influence of reflected light from the substrate could be suppressed and a favorable ejecting orifice pattern could be obtained.

Comparative Examples 1 and 2

Figure 5B:
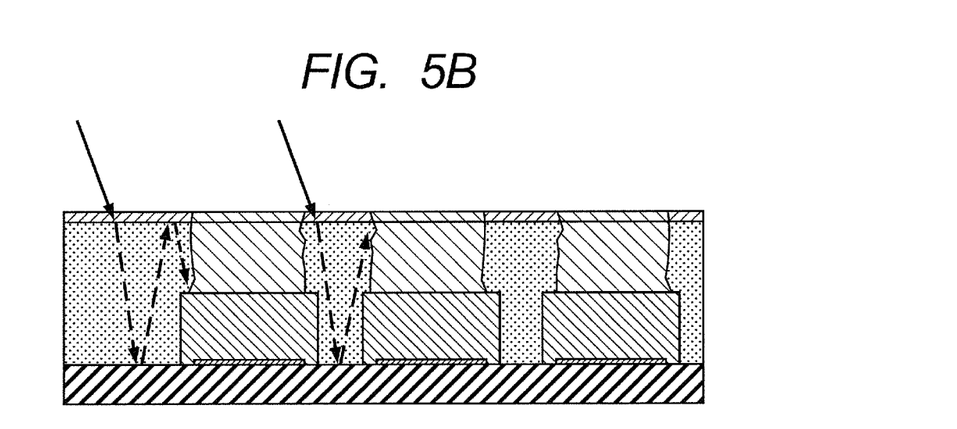

Each inkjet recording head was produced in the same manner as in each of Examples 1 and 2 except that the refractive index of the antireflective film 8 at a wavelength of 365 nm was changed to 1.49. In Comparative Examples 1 and 2, as illustrated in FIG. 5B, the influence of reflected light from the substrate on an ejecting orifice pattern was observed.

Since the reflectance factor in the antireflective film in each of Examples 1 to 4 was smaller than the reflectance factor in each of Comparative Examples 1 and 2 as illustrated in FIG. 6, the overall reflectance in the photosensitive resin layer 5a was reduced and a favorable pattern as illustrated in FIG. 5A was obtained from the latent image 11 to be formed into the ejecting orifice 7.

According to such a configuration, a method for manufacturing a liquid ejecting head that suppresses the influence of reflection from a substrate on an exposure pattern, can form an ejecting orifice pattern stably and is excellent in print quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-163055, filed Jul. 26, 2011, which is hereby incorporated by reference herein in its entirety.

What is claimed is:

1. A method for manufacturing a liquid ejecting head comprising an orifice plate having an ejecting orifice for ejecting a liquid and a liquid channel communicating with the ejecting orifice, and a substrate having an energy generating element for generating energy for ejecting the liquid and a liquid supply port communicating with the liquid channel, the method comprising the steps of:

(1) forming a liquid channel mold composed of a soluble resin to be dissolved in step (6) on the substrate on which the energy generating element is provided;

(2) coating the liquid channel mold with a photosensitive resin layer having a refractive index of n at an exposure wavelength used in step (4);

(3) forming an antireflective film having a refractive index of $\sqrt{n}-0.2$ or more to $\sqrt{n}+0.2$ or less at the exposure wavelength used in step (4) on the photosensitive resin layer;

(4) exposing and developing the photosensitive resin layer and the antireflective film to form the ejecting orifice;

(5) forming the liquid supply port in the substrate; and (6) dissolving the liquid channel mold and removing the mold from the liquid supply port, wherein the step (4) comprises pressing the antireflective film and the photosensitive resin layer that are in a state of a latent image after exposure, with a mold template having an asperity structure.

2. The method for manufacturing a liquid ejecting head according to claim 1, wherein the antireflective film comprises a perfluoroalkyl compound.

3. The method for manufacturing a liquid ejecting head according to claim 1, wherein the mold template having the asperity structure is a mold template wherein columnar projections having a width of 50 nm or more to 500 nm or less are arranged at a density of at least 5 projections/$\mu m^2$.

4. The method for manufacturing a liquid ejecting head according to claim 3, wherein a height of the columnar projection is greater than a thickness of the antireflective film.

5. The method for manufacturing a liquid ejecting head according to claim 1, wherein the antireflective film has the refractive index of 1.1 or more and 1.4 or less at the exposure wavelength used in the step (4).

6. The method for manufacturing a liquid ejecting head according to claim 5, wherein the antireflective film has the refractive index of 1.2 or more and 1.4 or less at the exposure wavelength used in the step (4).

7. The method for manufacturing a liquid ejecting head according to claim 5, wherein the exposure wavelength in the step (4) is 365 nm.

8. The method for manufacturing a liquid ejecting head according to claim 6, wherein the exposure wavelength in the step (4) is 365 nm.

9. The method for manufacturing a liquid ejecting head according to claim 1, wherein the photosensitive resin layer has the refractive index of 1.5 or more and 1.7 or less at the exposure wavelength used in the step (4).

10. The method for manufacturing a liquid ejecting head according to claim 9, wherein the exposure wavelength in the step (4) is 365 nm.

* * * * *